United States Patent
Choi et al.

(10) Patent No.: US 10,650,662 B2
(45) Date of Patent: May 12, 2020

(54) CONTROL APPARATUS FOR VEHICLE, VEHICLE, AND CONTROL METHOD OF VEHICLE

(71) Applicants: Hyundai Motor Company, Seoul (KR); Kia Motors Corporation, Seoul (KR)

(72) Inventors: Kyoung Hyouck Choi, Incheon (KR); Sang Gu Kwon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/206,613

(22) Filed: Nov. 30, 2018

(65) Prior Publication Data

US 2020/0098248 A1    Mar. 26, 2020

(30) Foreign Application Priority Data

Sep. 20, 2018 (KR) .......... 10-2018-0112678

(51) Int. Cl.
  G08B 25/01 (2006.01)
  G08B 25/10 (2006.01)
  G07C 5/00 (2006.01)
  B60R 21/00 (2006.01)

(52) U.S. Cl.
  CPC .......... *G08B 25/016* (2013.01); *G07C 5/008* (2013.01); *G08B 25/10* (2013.01); *B60R 2021/0027* (2013.01)

(58) Field of Classification Search
  CPC ...... G08B 25/016; G08B 25/10; G07C 5/008; B60R 2021/0027
  USPC ....................................... 340/425.5
  See application file for complete search history.

(56) References Cited

U.S. PATENT DOCUMENTS

| | | | |
|---|---|---|---|
| 6,195,602 B1 | 2/2001 | Hazama et al. | |
| 2004/0088087 A1* | 5/2004 | Fukushima | B60R 16/0231 701/29.6 |
| 2010/0256860 A1 | 10/2010 | Yamada | |
| 2011/0124311 A1* | 5/2011 | Stahlin | G08B 25/016 455/404.2 |
| 2011/0177791 A1* | 7/2011 | Stahlin | B60R 25/102 455/404.2 |
| 2012/0071140 A1 | 3/2012 | Oesterling et al. | |

(Continued)

FOREIGN PATENT DOCUMENTS

| JP | 2004-136701 A | 5/2004 |
|---|---|---|
| JP | 2013-102393 A | 5/2013 |
| JP | 2015-147446 A | 8/2015 |

*Primary Examiner* — Omar Casillashernandez
(74) *Attorney, Agent, or Firm* — Morgan, Lewis & Bockius LLP

(57) ABSTRACT

A control apparatus configured for vehicle, a vehicle and a control method of vehicle, may include an emergency call unit configured to generate an emergency rescue signal by recognizing an emergency situation of vehicle, a head unit configured to provide audio information to a user, and a main controller configured to control at least one component contained in the vehicle, wherein the main controller stores a vehicle identification number in advance, the head unit receives the vehicle identification number from the main controller and the emergency call unit receives the vehicle identification number from the head unit.

18 Claims, 7 Drawing Sheets

(56) References Cited

U.S. PATENT DOCUMENTS

| | | | |
|---|---|---|---|
| 2013/0237174 A1* | 9/2013 | Gusikhin | H04W 4/90 455/404.1 |
| 2014/0253308 A1* | 9/2014 | Kanda | G08G 1/205 340/436 |
| 2016/0197783 A1* | 7/2016 | Hort | H04L 69/18 709/222 |
| 2017/0134164 A1 | 5/2017 | Haga et al. | |
| 2017/0136973 A1* | 5/2017 | Lee | B60R 21/01512 |
| 2017/0171733 A1* | 6/2017 | Jung | G06K 9/00791 |
| 2017/0265049 A1* | 9/2017 | Kim | G08B 25/016 |
| 2017/0337753 A1* | 11/2017 | Joodaki | G07C 5/0841 |
| 2018/0075380 A1* | 3/2018 | Perl | G06Q 10/0635 |
| 2018/0176757 A1* | 6/2018 | Kaindl | G08B 25/016 |
| 2019/0232908 A1* | 8/2019 | Wang | B60R 21/0132 |
| 2019/0318555 A1* | 10/2019 | Hansel | G07C 5/0858 |

* cited by examiner

CONTROL APPARATUS FOR VEHICLE, VEHICLE, AND CONTROL METHOD OF VEHICLE

CROSS-THRESHOLD TO RELATED APPLICATION(S)

The present application claims priority to Korean Patent Application No. 10-2018-0112678, filed on Sep. 20, 2018, in the Korean Intellectual Property Office, the entire contents of which is incorporated herein for all purposes by this reference.

BACKGROUND OF THE INVENTION

Field of the Invention

The present invention relates to a control apparatus for vehicle, a vehicle and a control method of vehicle.

Description of Related Art

Thanks to the development of communication technology, the wireless communications are widely used in the vehicle. In recent years, the safety and convenience of the driver has been increased since a vehicle can communicate with a remote server and exchange a variety of information.

An emergency rescue signal (emergency call or e-call) transmission function is one example of securing the safety of the driver by use of the telecommunication. If a problem, an accident or a crime occurs in the vehicle, an emergency rescue signal is automatically generated and then transmitted to an emergency center, police station or hospital. Therefore, it is possible to immediately take an action for the situation of the vehicle.

According to a conventional manner, only emergency call unit is disposed in a vehicle to transmit an emergency rescue signal. Recently, a study has been conducted for additionally mounting a head unit in the vehicle, wherein the head unit is configured to provide a variety of multimedia or a calling service to a driver by communicating with the outside such as a portable terminal. In the study, it turned out that there is a problem that an error occurs on the communication due to the collision between network specifications of the emergency call unit and network specifications of the head unit for an emergency rescue signal transmission.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle configured for operating a head unit and an emergency call unit without problems in the vehicle, and a control method thereof.

Additional various aspects of the present invention will be set forth in portion in the description which follows and, in part, will be obvious from the description, or may be learned by practice of the present invention.

In accordance with an aspect of the disclosure, vehicle may include an emergency call unit configured to generate an emergency rescue signal by recognizing an emergency situation of vehicle, a head unit configured to provide audio information to a user, and a main controller configured to control at least one component contained in the vehicle. The main controller stores a vehicle identification number in advance, the head unit receives the vehicle identification number from the main controller and the emergency call unit receives the vehicle identification number from the head unit.

The head unit may include a head external communicator configured to perform wireless communication with an external device.

The head unit may transmit an information value indicating whether the head unit is configured to perform the wireless communication with an external device, to the emergency call unit.

When it is identified that the head unit is configured to perform the wireless communication with an external device, the emergency call unit may receive the vehicle identification number from the head unit and when it is identified that the head unit is not configured to perform the wireless communication with an external device, the emergency call unit may receive the vehicle identification number from the main controller.

When receiving the information value indicating that the head unit is configured to perform the wireless communication with an external device, the emergency call unit may receive the vehicle identification number from the head unit, and when receiving the information value indicating that the head unit is not configured to perform the wireless communication with an external device, the emergency call unit may receive the vehicle identification number from the main controller.

When receiving the information value indicating that the head unit is configured to perform the wireless communication with an external device, within a predetermined time period, the emergency call unit may receive the vehicle identification number from the head unit, and if not receiving the information value indicating that the head unit is configured to perform the wireless communication with an external device, for the predetermined time period, the emergency call unit may receive the vehicle identification number from the main controller.

The head unit may store the received vehicle identification number and when receiving a vehicle identification number request signal from the emergency call unit, the head unit may transmit the stored vehicle identification number to the emergency call unit.

The emergency call unit may receive the vehicle identification number by monitoring a vehicle identification number which is transmitted from the main controller to the head unit.

The main controller may include a main memory in which the vehicle identification number is stored in advance, and a main processor configured to control at least one component contained in the vehicle.

The emergency call unit, the main controller and the head unit, respectively may include an internal communicator configured to transmit and receive the vehicle identification number in the vehicle.

When power is supplied to the head unit, the head unit may transmit information value indicating whether the head unit is configured to perform the wireless communication with an external device, to the emergency call unit.

Vehicle identification number stored in the emergency call unit and the head unit may be deleted when the power is not supplied to the emergency call unit and the head unit.

In accordance with another aspect of the disclosure, a control method of a vehicle including an emergency call unit configured to generate an emergency rescue signal by recognizing an emergency situation of vehicle, a head unit configured to provide audio information to a user, and a main controller configured to control at least one component contained in the vehicle, the control method may include an operation in which the head unit receives a vehicle identification number, which is stored in the main controller in advance, from the main controller, and an operation in which the emergency call unit receives the vehicle identification number from the head unit.

The head unit may be configured to perform wireless communication with an external device.

The control method may further include prior to the reception of the vehicle identification number from the main controller, an operation in which the head unit transmits an information value indicating whether the head unit is configured to perform the wireless communication with an external device, to the emergency call unit.

The reception of the vehicle identification number by the emergency call unit may include an operation in which the emergency call unit receives the vehicle identification number from the head unit when it is identified that the head unit is configured to perform the wireless communication with an external device and, an operation in which the emergency call unit receives the vehicle identification number from the main controller when it is identified that the head unit is not configured to perform the wireless communication with an external device.

The reception of the vehicle identification number by the emergency call unit may include an operation in which the emergency call unit receives the vehicle identification number from the head unit, when receiving the information value indicating that the head unit is configured to perform the wireless communication with an external device, and an operation in which the emergency call unit receives the vehicle identification number from the main controller when receiving the information value indicating that the head unit is not configured to perform the wireless communication with an external device.

The reception of the vehicle identification number by the emergency call unit may include an operation in which the emergency call unit receives the vehicle identification number from the head unit, when receiving the information value indicating that the head unit is configured to perform the wireless communication with an external device, within a predetermined time period, and an operation in which the emergency call unit receives the vehicle identification number from the main controller, if not receiving the information value indicating that the head unit is configured to perform the wireless communication with an external device, for the predetermined time period.

The control method may further include prior to the reception of the vehicle identification number by the emergency call unit, an operation in which the head unit receives a vehicle identification number request signal from the emergency call unit, and an operation in which the head unit transmits the received vehicle identification number to the emergency call unit.

The reception of the vehicle identification number by the emergency call unit may include an operation in which the emergency call unit receives the vehicle identification number by monitoring a vehicle identification number which is transmitted from the main controller to the head unit.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
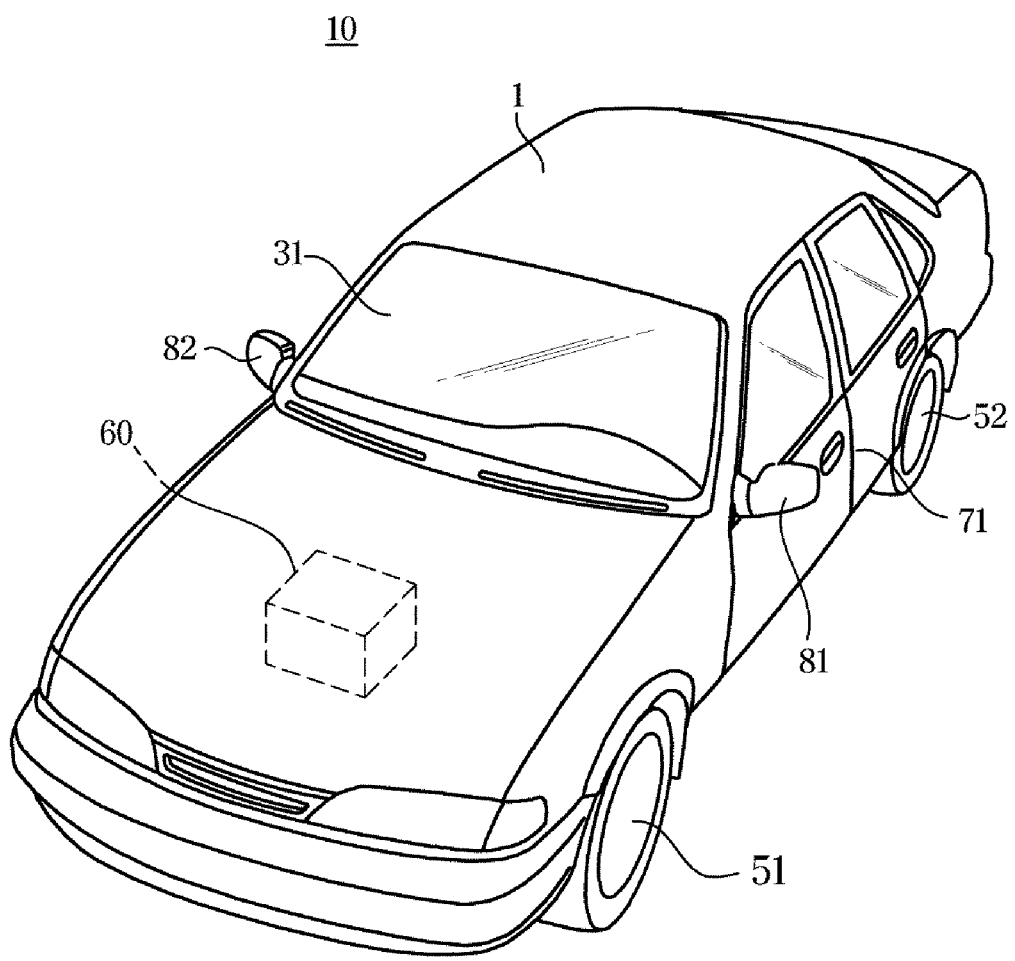
FIG. 1 is a schematic view exemplarily illustrating an external of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network".

Further, when a portion "includes" or "comprises" an element, unless there is a description contrary thereto, the portion may further include other elements, not excluding the other elements.

Throughout the description, when a member is "on" another member, the present includes not only when the member is in contact with the other member, but also when there is another member between the two members.

It will be understood that, although the terms first, second, third, etc., may be used herein to describe various elements, but may not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present invention, examples of which are illustrated in the accompanying drawings.

Figure 2:
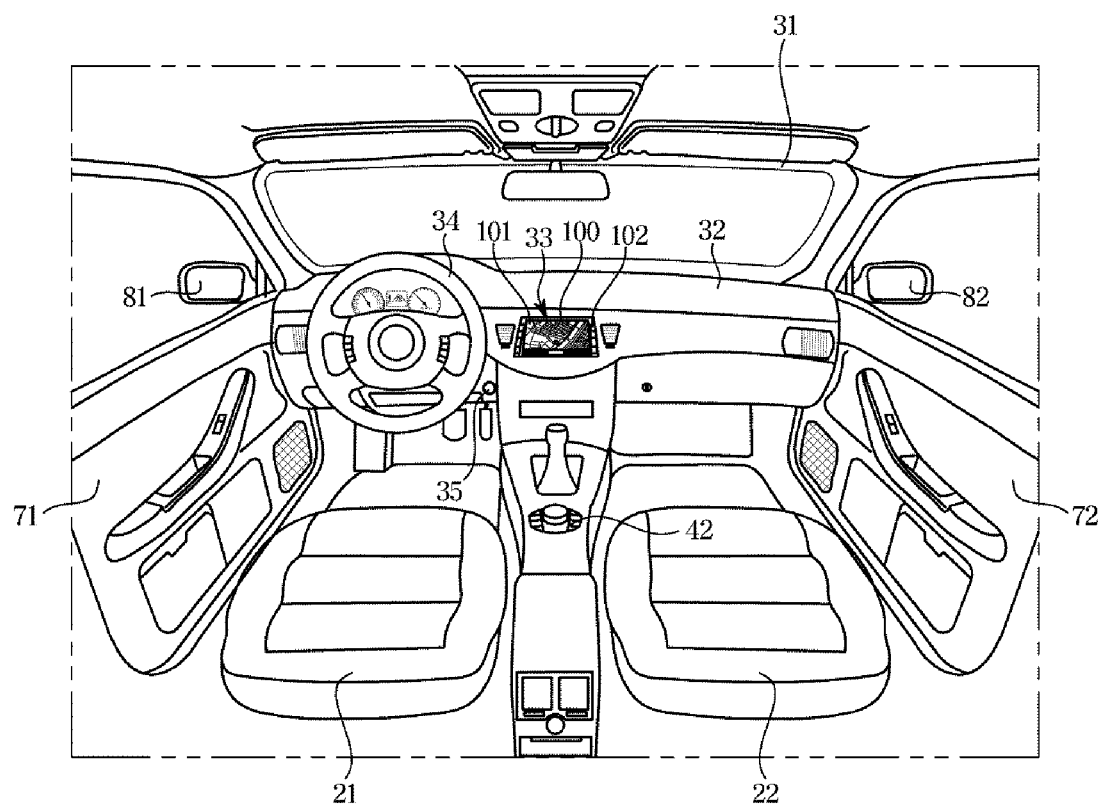
FIG. 2 is a view exemplarily illustrating an internal of the vehicle according to an exemplary embodiment of the present invention.

FIG. 1 is a schematic view exemplarily illustrating an external of a vehicle according to an exemplary embodiment and FIG. 2 is a view exemplarily illustrating an internal of the vehicle according to an exemplary embodiment of the present invention.

Referring to FIG. 1, according an exemplary embodiment of the present invention, a vehicle 10 may include a body 1 forming an external of the vehicle 10, vehicle wheels 51 and 52 moving the vehicle 10, a driver 60 rotating the vehicle wheels 51 and 52, doors 71 and 72 closing the internal to the vehicle 10 from the outside, a front glass 31 providing a front view of the vehicle 10 to a driver within the vehicle 10, and side mirrors 81 and 82 providing a view of a rear side of the vehicle 10 to the driver.

The vehicle wheels 51 and 52 may include a front wheel 51 mounted on a front of the vehicle 10 and a rear wheel 52 mounted on a rear of the vehicle 10, and the driver 60 may supply a torque to the front wheel 51 and the rear wheel 52 so that the body 1 is moved forwards and backwards thereof. The driver 60 may employ an engine configured to generate a torque by burning fossil fuel or a motor configured to generate a torque by receiving power source from a battery.

The doors 71 and 72 may be rotatably mounted on a right side and a left side of the body 1. When the doors 71 and 72 are opened, a driver may be allowed to be accommodated in the vehicle 10, and when the doors 71 and 72 are closed, the internal to the vehicle 10 may be closed from the outside.

The front glass 31 may be mounted on an upper portion of the front of the vehicle 10 to allow the driver within the vehicle 10 to acquire visual information related to the forward of the vehicle 10 and may be referred to as "windshield glass".

The side mirrors 81 and 82 may include a left side mirror 81 mounted on the left side of the body 1 and a right side mirror 82 mounted on the right side of the body 1, and may allow the driver within the vehicle 10 to acquire visual information related to the lateral side and rear side of the vehicle 10.

According to an exemplary embodiment of the present invention, the vehicle 10 includes a head unit 100.

The head unit 100 embedded in or mounted on a dashboard 32 of the vehicle 10 may be implemented as an audio video navigation (AVN) device. The AVN device is a device configured for integrally performing an audio function, a video function, and a navigation function. Furthermore, the AVN device may further perform a calling function as well as the above mentioned functions.

An AVN display 101 and an AVN inputter 102 configured to provide the audio function, the video function and the navigation function to a driver may be mounted on the AVN device. The AVN display 101 and the AVN inputter 102 mounted on the AVN device may be mounted on a center fascia 33 corresponding to the center portion of the dashboard 32 of the vehicle 10, but the installation thereof is not limited thereto.

The AVN display 101 may selectively display at least one of an audio screen, a video screen, and a navigation screen, and further display a variety of control screens related to the vehicle 10 and a screen related to an additional function.

The AVN display 101 may be implemented by any one of various display devices, e.g., Liquid Crystal Display (LCD), Light Emitting Diode (LED), Plasma Display Panel (PDP), Organic Light Emitting Diode (OLED), and Cathode Ray Tube (CRT).

The AVN inputter 102 may be provided in a hard key type on an area adjacent to the AVN display 101. Alternatively, when the AVN display 101 is implemented by a touch screen, the AVN inputter 102 may be provided as a touch panel type on a front surface of the AVN display 101.

Furthermore, the head unit 100 may be implemented as an audio device that functions merely as a vehicle audio for reproducing music to a user or for tuning a radio frequency. In the case of an audio device, a communication module configured to communicate with the outside is not provided, which is different from the AVN device.

A description of the head unit 100 will be described later in details.

A jog shuttle type center inputter 42 may be provided between a driver seat 21 and a passenger seat 22. The user can input a control command of the AVN device by turning or pressing the center inputter 42 or by sliding the center inputter 42 up, down, left or right direction thereof.

A steering wheel 34 may be mounted on the dashboard 32 in the driver seat 21 side, and a start button 35 configured to turn on/off an ignition of the vehicle 10 may be mounted on a region adjacent to the steering wheel 34.

Figure 3:
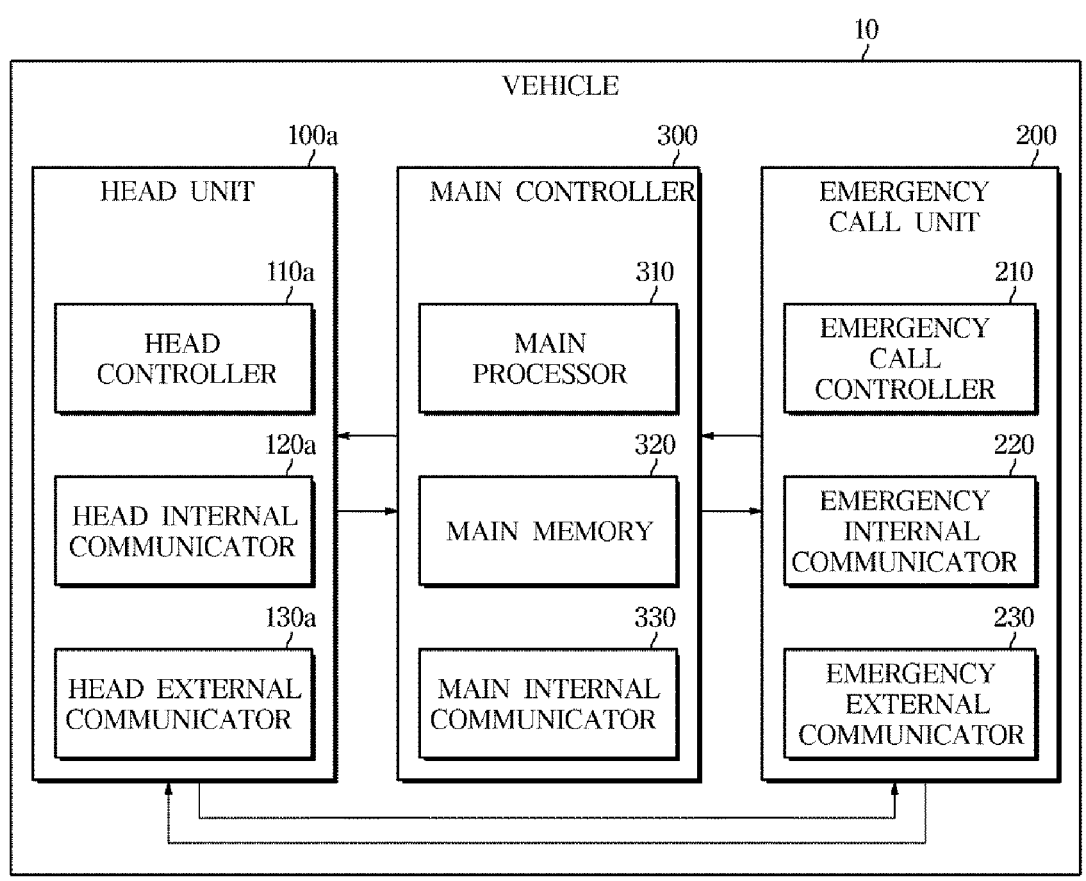
FIG. 3 is a control block diagram illustrating the vehicle according to an exemplary embodiment of the present invention.
Figure 4:
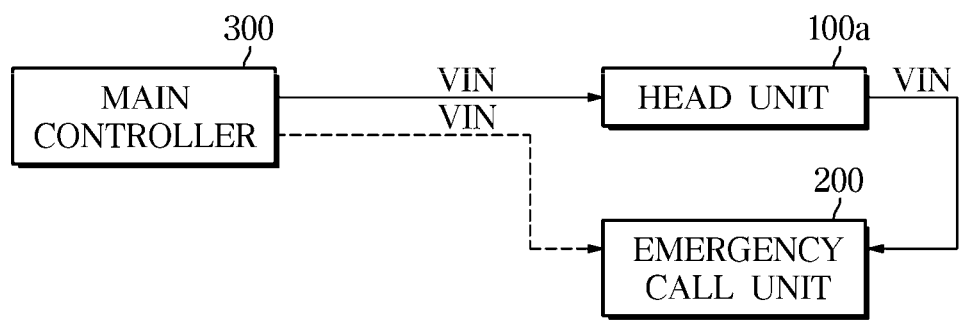
FIG. 4 is a diagram illustrating a process of performing communication among components contained in the vehicle according to an exemplary embodiment of the present invention.

FIG. 3 is a control block diagram illustrating the vehicle according to an exemplary embodiment of the present invention, and FIG. 4 is a diagram illustrating a process of performing communication among components contained in the vehicle according to an exemplary embodiment of the present invention.

Referring to FIG. 3, according to an exemplary embodiment of the present invention, the vehicle 10 includes a head unit 100*a*, an emergency call unit 200, and a main controller 300.

According to an exemplary embodiment of the present invention, the head unit 100*a* of the vehicle 10 may represent a device having a head external communicator 130*a* configured to perform wireless communication with an external device based on an unique identification value of the vehicle 10 (hereinafter referred to as vehicle identification number), and the head unit 110a may correspond to the above mentioned AVN device related to FIG. 2.

The head unit 100a may include a head controller 110a, a head internal communicator 120a, and a head external communicator 130a.

The head controller 110a is a component that controls overall components of the head unit 100a. According to an exemplary embodiment of the present invention, the head controller 110a may generate a control signal to control the head internal communicator 120a and the head external communicator 130a of the head unit 100a. Furthermore, the head controller 110a may receive a signal from the head internal communicator 120a and the head external communicator 130a.

The head controller 110a may be implemented using a memory storing an algorithm for controlling an operation of components in the head unit 100a and data related to programs implementing the algorithm, and a processor or performing the above mentioned operation using the data stored in the memory. The memory and the processor may be implemented in separate chips, or a single chip.

The head controller 110a may control the head internal communicator 120a so that the head internal communicator 120a transmits an information value, which indicates that the head unit 100a includes the head external communicator 130a, to an emergency call unit 200.

For example, when the ignition of the vehicle 10 is turned on or when power is supplied to the head unit 100a, the head controller 110a may control the head internal communicator 120a so that the head internal communicator 120a transmits "1" corresponding to a reference flag, which indicates that the head unit 100a includes the head external communicator 130a, to the emergency call unit 200.

When the head internal communicator 120a receives a vehicle identification number from the main controller 300 of the vehicle 10, the head controller 110a may receive the vehicle identification number from the head internal communicator 120a and store the received vehicle identification number in the memory. The vehicle identification number stored in the head controller 110a may be deleted when the power is not supplied to the head controller 110a.

The head controller 110a may control the head internal communicator 120a so that the head internal communicator 120a transmits the stored vehicle identification number to the emergency call unit 200.

Furthermore, the head controller 110a may transmit the stored vehicle identification number to the head external communicator 130a, and the head controller 110a may control the head external communicator 130a so that the head external communicator 130a transmits the stored vehicle identification number to the outside. The outside may correspond to a variety of devices, such as an external server, another vehicle or a portable terminal, which is placed outside of the vehicle 10 and configured to perform the wireless communication.

For example, when a user inputs a vehicle check command through an input device such as the AVN inputter 102 or the center inputter 42, the head controller 110a may control the head external communicator 130a so that the head external communicator 130a transmits the vehicle identification number to the service center.

The head controller 110a may transmit a variety of external information contained in an external signal, which is transmitted via the head external communicator 130a, to the head internal communicator 120a or the head controller 110a may process a variety of external information contained in an external signal and then transmit the processed external information to the head internal communicator 120a. Furthermore, the head controller 110a may control the head internal communicator 120a so that the head internal communicator 120a transmits the external information to each component of the vehicle 10.

The head internal communicator 120a may receive a variety of internal information from components of the vehicle 10 via an in-vehicle network and transmit the internal information to the head controller 110a or the head internal communicator 120a may transmit control data, which is generated based on a control signal of the head controller 110a, to other component of the vehicle 10 via the in-vehicle network.

For this, the head internal communicator 120a may include one or more components configured to allow components of the vehicle 10 to communicate with each other. For example, the head internal communicator 120a may include a controller area network (CAN) communication module to transmit and receive a signal to or from other component in the vehicle 10 via the CAN bus, or may employ a communication method corresponding to an emergency internal communicator 220 and a main internal communicator 330.

The head internal communicator 120a may transmit an information value, which indicates that the head unit 100a includes the head external communicator 130a, to the emergency call unit 200, based on the control signal of the head controller 110a.

For example, the head internal communicator 120a may transmit "1" corresponding to the reference flag to the emergency call unit 200.

The head internal communicator 120a may receive the vehicle identification number from the main controller 300 of the vehicle 10, and then transmit the received vehicle identification number to the head controller 110a.

The head internal communicator 120a may transmit the vehicle identification number to the emergency call unit 200 in a response to the control signal of the head controller 110a.

The head external communicator 130a may receive a variety of external information from the outside of the vehicle 10 via the wireless communication network and transmit the external information to the head controller 110a or the head external communicator 130a may transmit control data, which is generated based on a control signal of the head controller 110a, to the outside of the vehicle 10 via the wireless communication network.

The head external communicator 130a may include at least one component configured to perform wireless communicate with the outside. For example, the head external communicator 130a may include at least one of a short range communication module, and a wireless communication module.

The wireless communication module may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The head external communicator 130a may transmit the vehicle identification number, which is transmitted from the head controller 110a, to the outside.

Furthermore, the head external communicator 130a may receive an external signal from the outside thereof and transmit the received external signal to the head controller 110a.

The emergency call unit 200 recognizes an emergency situation such as collision or rollover of the vehicle 10 and selects whether to deploy the airbag or generates an emergency rescue signal (emergency call or an e-call). The emergency call unit 200 transmits the generated emergency rescue signal (emergency call or an e-call) to the outside, such as a medical center, an insurance company, or an emergency center.

The emergency rescue signal may include a unique vehicle identification number, which is assigned to the vehicle 10, to allow the outside of the vehicle 10 to identify the vehicle 10. Therefore, since the vehicle identification number is stored in the main controller 300, a process in which the emergency call unit 200 firstly brings the vehicle identification number from the main controller 300, is needed when the emergency call unit 200 is turned on. However, as well as the emergency call unit 200, the head unit 100a configured to perform wireless communication with the outside may also perform the wireless communication based on the vehicle identification number. Therefore, it is required for the head unit 100a to bring the vehicle identification number from the main controller 300 when the head unit 100a is turned on. Accordingly, an error may occur by a collision at the network between the emergency call unit 200 and the head unit 100a.

Referring to FIG. 4, according to an exemplary embodiment of the present invention, to prevent the network collision error, the emergency call unit 200 of vehicle 10 may receive not from the main controller 300, but from the vehicle identification number (VIN) from the head unit 100a.

Referring to again FIG. 3, according to an exemplary embodiment of the present invention, the emergency call unit 200 may include an emergency call controller 210, an emergency internal communicator 220, and an emergency external communicator 230.

The emergency call controller 210 may identify the occurrence of an emergency situation by recognizing a situation such as a collision or rollover of the vehicle 10 and may deploy an airbag when an emergency occurs.

For example, the vehicle 10 may be provided with an airbag sensor configured for detecting the movement of the vehicle 10 by measuring the acceleration of the vehicle 10. When it is identified that the movement of the vehicle 10 exceeds a predetermined value based on the detection result of the airbag sensor, the emergency call controller 210 may identify that the emergency situation such as a collision or rollover of the vehicle 10 occurs.

Furthermore, the emergency call controller 210 may control the emergency external communicator 230 so that the emergency external communicator 230 transmits the emergency rescue signal to the outside when an emergency occurs.

As mentioned above, the emergency rescue signal may include the vehicle identification number. For this, the emergency call controller 210 may control the emergency external communicator 230 so that the emergency external communicator 230 transmits the vehicle identification number, which is received from the head unit 100a via the emergency internal communicator 220, to the outside, such as a medical center, an insurance company, or an emergency center.

Furthermore, the emergency call controller 210 may store the vehicle identification number, which is received from the head unit 100a via the emergency internal communicator 220, in a memory of the emergency call controller 210. The vehicle identification number stored in the memory of the emergency call controller 210 may be deleted when the power is not supplied to the emergency call unit 200.

Unlike FIG. 2, the head unit 100 according to another exemplary embodiment of the present invention may not include the head external communicator 130a. In the instant case, the head unit 100 does not need the vehicle identification number and thus the emergency call unit 200 according to another exemplary embodiment of the present invention may receive the vehicle identification number from the main controller 300 instead of the head unit 100.

Therefore, the emergency call unit 200 may identify whether the head unit 100 needs the vehicle identification number or not. To identify whether the head unit 100 needs the vehicle identification number, the emergency call unit 200 may receive an information value indicating whether the head unit 100 includes the head external communicator 130a.

According to an exemplary embodiment of the present invention, the emergency call controller 210 may identify whether the head unit 100a includes the head external communicator 130a based on the information value received via the emergency internal communicator 220, and when it is identified that the head unit 100a includes the head external communicator 130a, the emergency call controller 210 may control the head internal communicator 120a so that the head internal communicator 120a receives the vehicle identification number from the head unit 100a.

For example, when the emergency call controller 210 receives "1" corresponding to the reference flag, the emergency call controller 210 may identify that the head unit 100a includes the head external communicator 130a, and when the emergency call controller 210 receives "0" corresponding to the reference flag, the emergency call controller 210 may identify that the head unit 100 does not include the head external communicator 130a.

When the emergency call controller 210 does not receive the information value indicating whether the head unit 100 includes the head external communicator 130a, from the head unit 100 for a predetermined time period, the emergency call controller 210 may identify that the head unit 100 does not include the head external communicator 130a.

According to an exemplary embodiment of the present invention, when the emergency call controller 210 receives the information value indicating of including the head external communicator 130a, from the head unit 100, the emergency call controller 210 may control the emergency internal communicator 220 so that the emergency internal communicator 220 transmits a vehicle identification number request signal to the head unit 100a to receive the vehicle identification number from the head unit 100a. Alternatively, the emergency call controller 210 may directly acquire the vehicle identification number, which is transmitted from the main controller 300 to the head unit 100a, by monitoring a signal transmission and reception process between the head unit 100a and the main controller 300.

The emergency call controller 210 may be implemented using a memory storing an algorithm for controlling an operation of components in the emergency call unit 200 and data related to programs implementing the algorithm, and a processor or performing the above mentioned operation using the data stored in the memory. The memory and the processor may be implemented in separate chips, or a single chip.

The emergency internal communicator 220 may receive internal information from components of the vehicle 10 via an in-vehicle network and transmit the internal information to the emergency call controller 210 or the emergency internal communicator 220 may transmit control data, which is generated based on a control signal of the emergency call controller 210, to other component of the vehicle 10 via the in-vehicle network.

For this, the emergency internal communicator 220 may include one or more components configured to allow components of the vehicle 10 to communicate with each other. For example, the emergency internal communicator 220 may include a controller area network (CAN) communication module to transmit and receive a signal to or from other component in the vehicle 10 via the CAN bus, or may employ a communication method corresponding to the head internal communicator 120a and a main internal communicator 330.

The emergency internal communicator 220 may receive the vehicle identification number from the head unit 100a.

To receive the vehicle identification number from the head unit 100a, the emergency internal communicator 220 may be on standby based on the control signal of the emergency call controller 210 until the vehicle identification number is transmitted to the emergency internal communicator 220. Alternatively, the emergency internal communicator 220 may directly receive the vehicle identification number, which is transmitted to the head unit 100a from the main controller 300, by monitoring a signal transmission and reception process between the head unit 100a and the main controller 300.

The emergency internal communicator 220 may receive an information signal indicating whether the head unit 100 includes the head external communicator 130a.

The emergency external communicator 230 may receive external information from the outside of the vehicle 10 via the wireless communication network and transmit the external information to the emergency call controller 210 or the emergency external communicator 230 may transmit control data, which is generated based on a control signal of the emergency call controller 210, to the outside of the vehicle 10 via the wireless communication network.

The emergency external communicator 230 may include at least one component configured to perform wireless communicate with the outside. For example, the emergency external communicator 230 may include at least one of a short range communication module, and a wireless communication module. The emergency external communicator 230 may be separated from the head external communicator 130a of the head unit 100a and employ the communication method which is the same as or different from the head external communicator 130a.

The wireless communication module may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

When the emergency situation occurs, the emergency external communicator 230 may transmit the vehicle identification number to the outside in a response to the control signal of the emergency call controller 210.

The emergency external communicator 230 may receive an external signal from the outside thereof and transmit the received external signal to the emergency call controller 210.

The external signal transmitted and received by the emergency external communicator 230 may include a variety radio signals for emergency rescue of the vehicle 10 or passengers in the vehicle 10.

The main controller 300 may be implemented by an Electronic Control Unit (ECU) configured to control an operation of the power system, the power train, the driving device, the steering system, the brake system, the suspension system, the transmission device, the fuel system, the variety of safety devices, and the variety of sensors of the vehicle 10.

The main controller 300 may be implemented using a main memory 320 storing an algorithm for controlling an operation of components in the main controller 300 and data related to programs implementing the algorithm, and a main processor 310 performing the above mentioned operation using the data stored in the main memory 320. The main memory 320 and the main processor 310 may be implemented in separate chips, or a single chip.

The main controller 300, the head controller 110a of the head unit 100a, and the emergency call controller 210 of the emergency call unit 200 may be implemented as a separate hardware component or as a software component which is provided as a hardware component and performs each function.

The main controller 300 may further include a main internal communicator 330 transmitting and receiving internal information with other components in the vehicle 10.

The main processor 310 is a component that controls overall components of the main controller 300. According to an exemplary embodiment of the present invention, the main processor 310 may generate a control signal to control the main internal communicator 330 based on the vehicle identification number pre-stored in the main memory 320. Furthermore, the main processor 310 may receive an internal signal from the main internal communicator 330.

When receiving the vehicle identification number request signal from the head unit 100a, the main processor 310 may control the main internal communicator 330 so that the main internal communicator 330 transmits the vehicle identification number stored in the main memory 320 to the head unit 100a.

The main memory 320 stores the vehicle identification number in advance, and the vehicle identification number is a value inherently assigned to the vehicle 10. Furthermore, the vehicle identification number may be a value stored in the manufacturing process of the vehicle 10 or in the repair process in advance.

The vehicle identification number stored in the main memory 320 may not be deleted even when power is not supplied to the main controller 300.

The main memory 320 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto.

The main internal communicator 330 may receive a variety of internal information from components of the vehicle 10 via an in-vehicle network and transmit the internal information to the main processor 310 or the main internal communicator 330 may transmit control data, which is generated based on a control signal of the main processor 310, to other component of the vehicle 10 via the in-vehicle network.

For this, the main internal communicator 330 may include one or more components configured to allow components of the vehicle 10 to communicate with each other. For example, the main internal communicator 330 may include a controller area network (CAN) communication module to transmit and receive a signal to or from other component in the vehicle 10 via the CAN bus, or may employ a communication method corresponding to the head internal communicator 120a and the emergency internal communicator 220.

The main internal communicator 330 may receive the vehicle identification number request signal from the head unit 100a, and transmit the vehicle identification number to the head unit 100a based on the control signal of the main processor 310.

Meanwhile, according to another exemplary embodiment of the present invention, the vehicle 10 may not include the head external communicator 130a and in the instant case, the emergency call unit 200 may not receive the vehicle identification number from the head unit 100.

Figure 5:
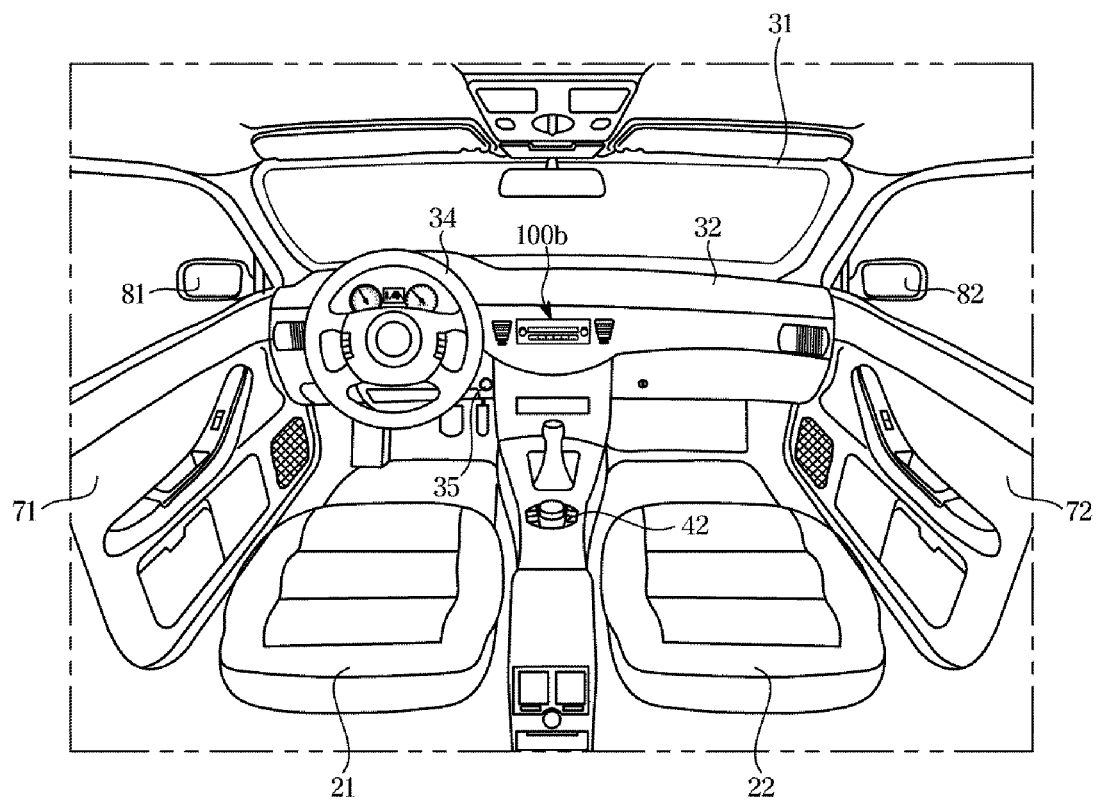
FIG. 5 is a view exemplarily illustrating an internal of a vehicle according to another exemplary embodiment of the present invention.
Figure 6:
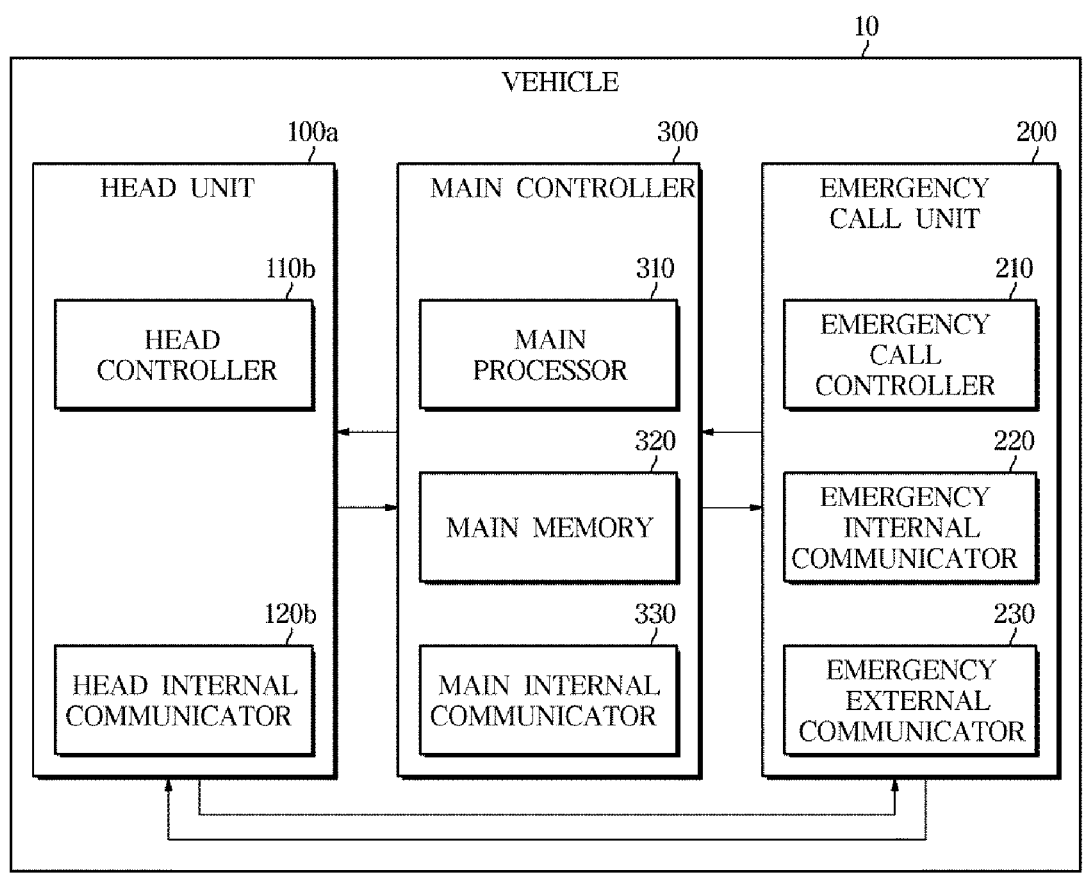
FIG. 6 is a control block diagram illustrating the vehicle according to another exemplary embodiment of the present invention.
Figure 7:
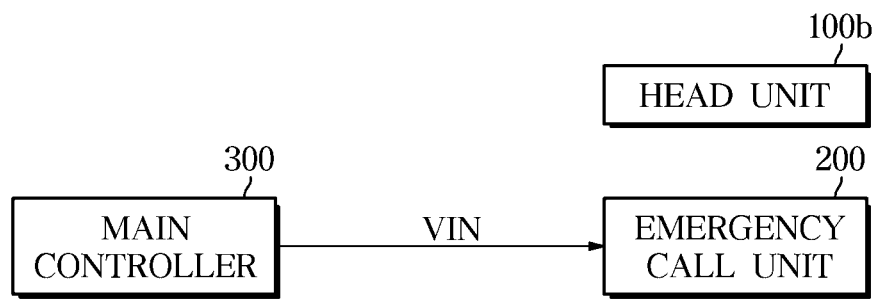
FIG. 7 is a diagram illustrating a process of performing communication among components contained in the vehicle according to another exemplary embodiment of the present invention.

FIG. 5 is a view exemplarily illustrating an internal of the vehicle according to another exemplary embodiment of the present invention, FIG. 6 is a control block diagram illustrating the vehicle according to another exemplary embodiment and FIG. 7 is a diagram illustrating a process of performing communication among components contained in the vehicle according to another exemplary embodiment of the present invention.

Referring to FIG. 5 and FIG. 6, according to another exemplary embodiment of the present invention, a head unit 100b of the vehicle 10 may not include a head external communicator 130a, unlike the head unit 100a of the vehicle 10 according to an exemplary embodiment of the present invention. For example, the head unit 100b may be implemented as the above mentioned audio device related to FIG. 2.

According to another exemplary embodiment of the present invention, the head unit 100b may include a head controller 110b and a head internal communicator 120b.

According to another exemplary embodiment of the present invention, the head controller 110b may generate a control signal to control the head internal communicator 120b in the same manner as the head controller 110a according to an exemplary embodiment of the present invention.

According to another exemplary embodiment of the present invention, the head controller 110b may control the head internal communicator 120b so that the head internal communicator 120b transmits an information value indicating that the head unit 100b does not include the head external communicator 130a, to the emergency call unit 200.

For example, when the ignition of the vehicle 10 is turned on or when power is supplied to the head unit 100b, the head controller 110b may control the head internal communicator 120b so that the head internal communicator 120b transmits "0" corresponding to a reference flag, which indicates that the head unit 100b does not include the head external communicator 130b, to the emergency call unit 200.

Since the head controller 110b does not need the vehicle identification number according to another exemplary embodiment of the present invention, it may not be required that the head controller 110b controls the head internal communicator 120b so that the head internal communicator 120b transmits the vehicle identification number to the emergency call unit 200.

A description related to the head controller 110b according to another exemplary embodiment of the present invention is the same as that of the head controller 110a according to an exemplary embodiment of the present invention, and a detailed description will be omitted.

The head internal communicator 120b may receive information from components of the vehicle 10 via an in-vehicle network and transmit the internal information to the head controller 110b or the head internal communicator 120b may transmit control data, which is based on a control signal of the head controller 110b, to other component of the vehicle 10 via the in-vehicle network.

For this, the head internal communicator 120b may include one or more components configured to allow components of the vehicle 10 to communicate with each other. For example, the head internal communicator 120b may include a controller area network (CAN) communication module to transmit and receive a signal to or from other component in the vehicle 10 via the CAN bus.

The head internal communicator 120b may transmit an information value, which indicates that the head unit 100b does not include the head external communicator 130b, to an emergency call unit 200, based on the control signal of the head controller 110b.

For example, the head internal communicator 120b may transmit "0" corresponding to the reference flag to the emergency call unit 200.

Since the head unit 100b does not include the head external communicator 130b, the head controller 110b may not transmit the reference flag although the ignition of the vehicle 10 is turned on or power is supplied to the head unit 100b.

Since the head unit 100b does not need the vehicle identification number according to another exemplary embodiment of the present invention, the head internal communicator 120b according to another exemplary embodiment of the present invention may not receive the vehicle identification number from the main controller 300 unlike the head internal communicator 120a according to an exemplary embodiment of the present invention.

A description related to the head internal communicator 120b according to another exemplary embodiment of the present invention is the same as that of the head internal communicator 120a according to an exemplary embodiment of the present invention, and a detailed description will be omitted.

Referring to FIG. 7, the head unit 100b of the vehicle 10 according to another exemplary embodiment does not need the vehicle identification number and therefore does not request the vehicle identification number to the main controller 300. Accordingly, the network collision error may not occur between the head unit 100b and the emergency call unit 200.

According to another exemplary embodiment of the present invention, the emergency call unit 200 may directly receive the vehicle identification number from the main controller 300.

Referring again to FIG. 6, according to another exemplary embodiment of the present invention, the emergency call controller 210 of the emergency call unit 200 may control the emergency external communicator 230 so that the emergency external communicator 230 transmits the vehicle identification number, which is received from the main controller 300 via the emergency internal communicator 220, to the outside, such as a medical center, an insurance company, or an emergency center.

Furthermore, according to another exemplary embodiment of the present invention, the emergency call controller 210 may store the vehicle identification number, which is received from the main controller 300 via the emergency internal communicator 220, in a memory of the emergency call controller 210. The vehicle identification number stored in the memory of the emergency call controller 210 may be deleted when the power is not supplied to the emergency call unit 200.

As mentioned above, the emergency call controller 210 may identify whether the head unit 100 includes the head external communicator 130a based on the information value received via the emergency internal communicator 220, and when it is identified that the head unit 100 does not include the head external communicator 130a, the emergency call controller 210 may control the emergency external communicator 230 so that the emergency external communicator 230 receives the vehicle identification number from the main controller 300.

For example, when the emergency call controller 210 receives "0" corresponding to the reference flag, the emergency call controller 210 may identify that the head unit 100b does not include the head external communicator 130a.

When the emergency call controller 210 does not receive the information value indicating whether the head unit 100b includes the head external communicator 130a, from the head unit 100b for a predetermined time period, the emergency call controller 210 may identify that the head unit 100b does not include the head external communicator 130a According to another exemplary embodiment of the present invention, when the emergency call controller 210 receives the information value indicating of excluding the head external communicator 130a, from the head unit 100b, or when the emergency call controller 210 does not receive the information value for the predetermined time of period, the emergency call controller 210 may control the emergency internal communicator 220 so that the emergency internal communicator 220 transmits a vehicle identification number request signal to the main controller 300 to receive the vehicle identification number from the main controller 300.

A description related to the emergency call controller 210 according to another exemplary embodiment of the present invention is the same as that of the emergency call controller 210 according to an exemplary embodiment of the present invention, and a detailed description will be omitted.

According to another exemplary embodiment of the present invention, the emergency internal communicator 220 may transmit the vehicle identification number request signal to the main controller 300 in a response to the control signal of the emergency call controller 210 and receive the vehicle identification number.

A description related to the emergency internal communicator 220 and the emergency external communicator 230 according to another exemplary embodiment of the present invention is the same as that of the emergency internal communicator 220 and the emergency external communicator 230 according to an exemplary embodiment of the present invention, and a detailed description will be omitted.

According to another exemplary embodiment of the present invention, when the main processor 310 of the main controller 300 receives the vehicle identification number request signal from the emergency call unit 200, the main processor 310 may control the main internal communicator 330 so that the main internal communicator 330 transmits the vehicle identification number, which is stored in the main memory 320, to the emergency call unit 200.

A description related to the main controller 300 according to another exemplary embodiment of the present invention is the same as that of the main controller 300 according to an exemplary embodiment of the present invention, and a detailed description will be omitted.

At least one component may be added or deleted corresponding to the performance of the components of the vehicle 10 illustrated in FIGS. 3 and 6. It will be readily understood by those skilled in the art that the mutual position of the components may be changed corresponding to the performance or structure of the system.

Meanwhile, some of the components shown in FIGS. 3 and 6 may be software and/or hardware components such as Field Programmable Gate Array (FPGA) and Application Specific Integrated Circuit (ASIC).

Hereinafter a control method of the vehicle 10 according to an exemplary embodiment and a control method of the vehicle 10 according to another exemplary embodiment will be described with reference to FIG. 8 and FIG. 9.

Figure 8:
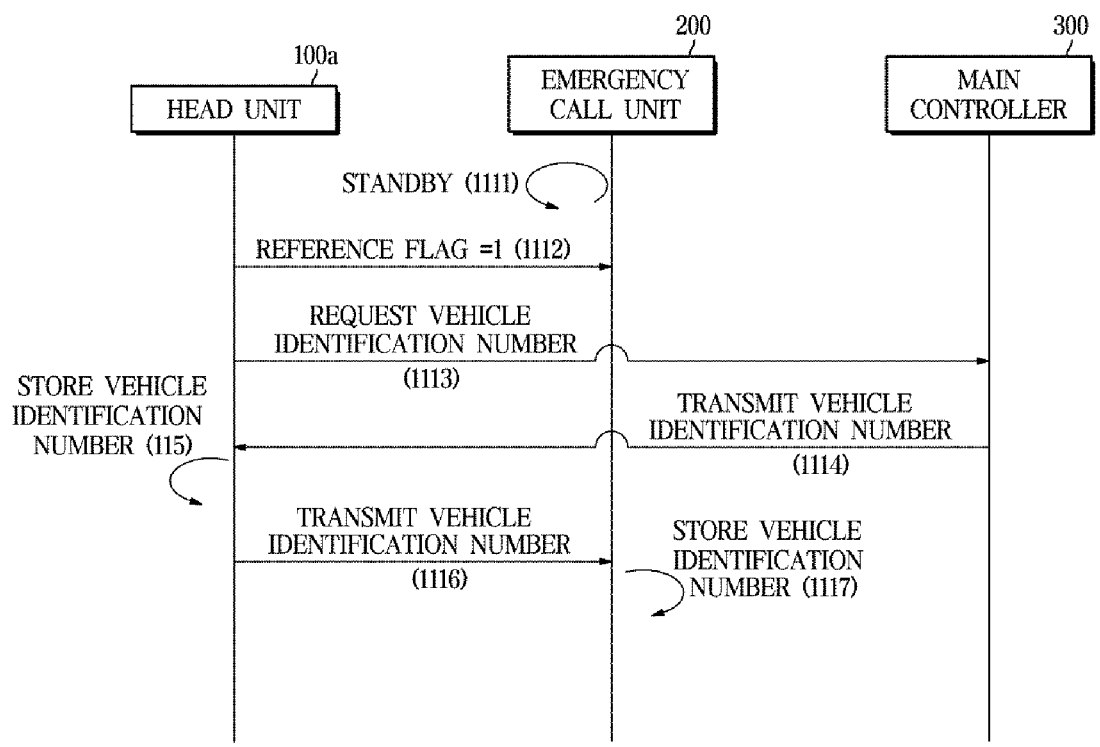
FIG. 8 is a flowchart illustrating a control method of vehicle according to an exemplary embodiment of the present invention.
Figure 9:
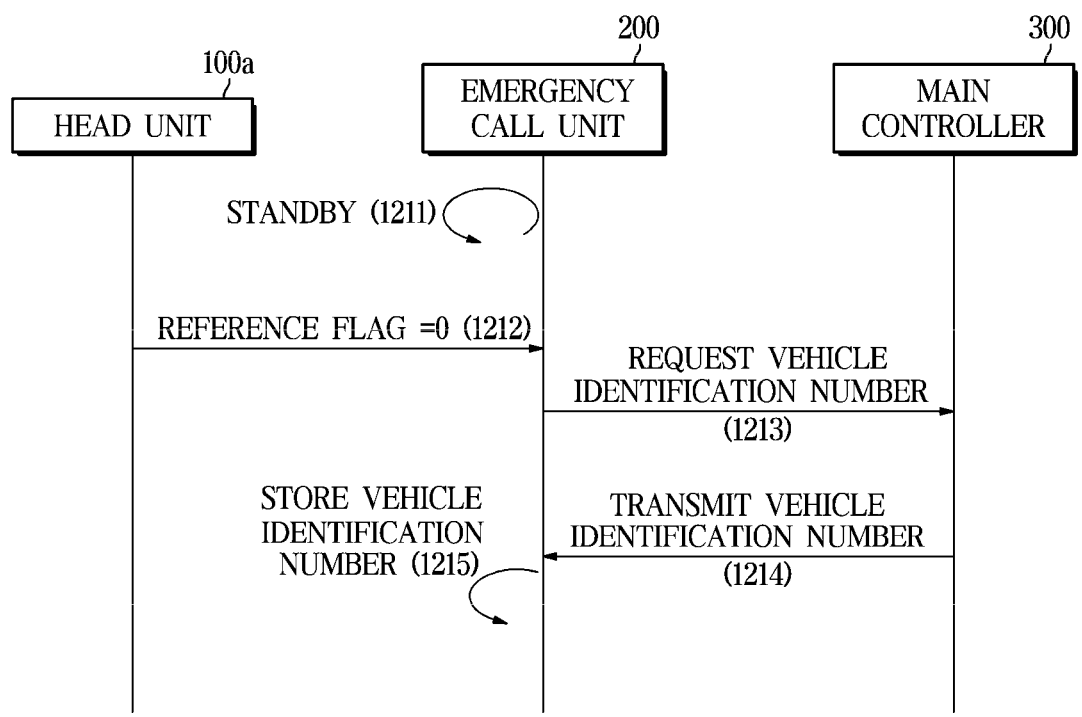
FIG. 9 is a flowchart illustrating a control method of vehicle according to an exemplary embodiment of the present invention.

FIG. 8 is a flowchart illustrating a control method of vehicle according to an exemplary embodiment and FIG. 9 is a flowchart illustrating a control method of vehicle according to an exemplary embodiment of the present invention.

According to an exemplary embodiment of the present invention, firstly, when the power is supplied to the head unit 100a, the emergency call unit 200, and the main controller 300 of the vehicle 10, the emergency call unit 200 may be on standby until receiving an information value indicating that the head unit 100a includes the head external communicator 130a, from the head unit 100a (1111).

Subsequently, when the emergency call unit 200 receives the reference flag "1" corresponding to the information value from the head unit 100a (1112), the emergency call unit 200 may be on standby to receive the vehicle identification number from the head unit 100a.

The head unit 100a to which the power is supplied may transmit the reference flag "1" to the emergency call unit 200 and transmit the vehicle identification number request signal to the main controller 300 (1113).

The head unit 100a may receive the vehicle identification number from the main controller 300 (1114), and store the received vehicle identification number therein (1115).

The head unit 100a may transmit the stored vehicle identification number to the emergency call unit 200 (1116), and the emergency call unit 200 may receive and store the vehicle identification number therein (1117).

According to the above-mentioned embodiment, the emergency call unit 200 directly receives the vehicle identification number from the head unit 100a. Alternatively, the emergency call unit 200 may additionally acquire the vehicle identification number, which is transmitted from the main controller 300 to the head unit 100a, by monitoring a process in which the vehicle identification number is transmitted from the main controller 300 to the head unit 100a.

According to another exemplary embodiment illustrated in FIG. 9, since the head unit 100b of the vehicle 10 does not include the head external communicator 130a, the emergency call unit 200 may be on standby to receive an information value indicating that the head unit 100b does not include the head external communicator 130a, from the head unit 100b when the power is supplied to the head unit 100b, the emergency call unit 200, and the main controller 300 of the vehicle 10 (1211).

Subsequently, when the emergency call unit 200 receives the reference flag "0" corresponding to the information value from the head unit 100b (1212), or when the emergency call unit 200 does not receive the information value for the predetermined time period, the emergency call unit 200 may transmit the vehicle identification number request signal to the main controller 300 (1213).

The head unit 100b may receive the vehicle identification number from the main controller 300 (1214), and store the received vehicle identification number therein (1215).

As is apparent from the above description, according to the control apparatus, vehicle and control method of vehicle, the head unit and the emergency call unit may smoothly perform the communication with the external device and inspect the vehicle without the network error.

Meanwhile, the disclosed exemplary embodiments may be embodied in a form of a recording medium storing instructions executable by a computer. The instructions may be stored in a form of program code and, when executed by a processor, may generate a program module to perform the operations of the included exemplary embodiments. The recording medium may be embodied as a computer-readable recording medium.

The computer-readable recording medium includes all kinds of recording media in which instructions which may be decoded by a computer are stored. For example, there may be a Read Only Memory (ROM), a Random Access Memory (RAM), a magnetic tape, a magnetic disk, a flash memory, and an optical data storage device.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
an emergency call unit configured to generate an emergency rescue signal by recognizing an emergency situation of the vehicle;
a head unit configured to provide audio information to a user; and
a main controller configured to control at least one component contained in the vehicle;
wherein the main controller is configured to store a vehicle identification number in advance, the head unit receives the vehicle identification number from the main controller and the emergency call unit receives the vehicle identification number from the head unit, and
wherein the head unit transmits an information value indicating when the head unit performs wireless communication with an external device, to the emergency call unit.

2. The vehicle of claim 1,
wherein the head unit includes a head external communicator configured to perform the wireless communication with the external device.

3. The vehicle of claim 1,
wherein, when it is identified that the head unit is configured to perform the wireless communication with the external device, the emergency call unit receives the vehicle identification number from the head unit, and
wherein, when it is identified that the head unit is not configured to perform the wireless communication with the external device, the emergency call unit receives the vehicle identification number from the main controller.

4. The vehicle of claim 1,
wherein, when receiving the information value indicating that the head unit is configured to perform the wireless communication with the external device, the emergency call unit receives the vehicle identification number from the head unit, and
wherein, when receiving the information value indicating that the head unit is not configured to perform the wireless communication with the external device, the emergency call unit receives the vehicle identification number from the main controller.

5. The vehicle of claim 1,
wherein, when receiving the information value indicating that the head unit is configured to perform the wireless communication with the external device, within a predetermined time period, the emergency call unit receives the vehicle identification number front the head unit, and
wherein, when not receiving the information value indicating that the head unit is configured to perform the wireless communication with the external device, for the predetermined time period, the emergency call unit receives the vehicle identification number from the main controller.

6. The vehicle of claim 1,
wherein the head unit stores the received vehicle identification number, and when receiving a vehicle identification number request signal from the emergency call unit, the head unit transmits the stored vehicle identification number to the emergency call unit.

7. The vehicle of claim 1,
wherein the emergency call unit receives the vehicle identification number by monitoring the vehicle identification number which is transmitted from the main controller to the head unit.

8. The vehicle of claim 1,
wherein the main controller includes a main memory in which the vehicle identification number is stored in advance, and a main processor configured to control the at least one component contained in the vehicle.

9. The vehicle of claim 1,
wherein the emergency call unit, the main controller and the head unit, respectively include an internal communicator configured to transmit or receive the vehicle identification number in the vehicle.

10. The vehicle of claim 1,
wherein, when power is supplied to the head unit, the head unit transmits the information value indicating when the head unit is configured to perform the wireless communication with the external device, to the emergency call unit.

11. The vehicle of claim 1,
wherein the vehicle identification number stored in the emergency call unit and the head unit is deleted when power is not supplied to the emergency call unit and the head unit.

12. A control method of a vehicle, the method including:
transmitting, by a head unit, an information value indicating when the head unit performs wireless communication with an external device, to an emergency call unit;
receiving, by the head unit, a vehicle identification number, which is stored in a main controller in advance, from the main controller; and
receiving, by the emergency call unit, the vehicle identification number from the head unit.

13. The control method of claim 12,
wherein the head unit is configured to perform the wireless communication with the external device.

14. The control method of claim 12, wherein the receiving, by the emergency call unit, of the vehicle identification number includes:
receiving, by the emergency call unit, the vehicle identification number from the head unit when it is identified that the head unit is configured to perform the wireless communication with the external device and
receiving, by the emergency call unit, the vehicle identification number from the main controller when it is identified that the head unit is not configured to perform the wireless communication with the external device.

15. The control method of claim 12,
wherein the receiving, by the emergency call unit, of the vehicle identification number includes:
receiving, by the emergency call unit, the vehicle identification number from the head unit, when receiving the information value indicating that the head unit is configured to perform the wireless communication with the external device; and
receiving, by the emergency call unit, the vehicle identification number from the main controller when receiving the information value indicating that the head unit is not configured to perform the wireless communication with the external device.

16. The control method of claim 12,
wherein the receiving, by the emergency call unit, of the vehicle identification number includes:
receiving, by the emergency call unit, the vehicle identification number from the head unit, when receiving the information value indicating that the head unit is configured to perform the wireless communication with the external device, within a predetermined time period; and
receiving, by the emergency call unit, the vehicle identification number from the main controller, when not receiving the information value indicating that the head unit is configured to perform the wireless communication with the external device, for the predetermined time period.

17. The control method of claim 12, further including:
before receiving, by the emergency call unit, of the vehicle identification number, receiving, by the head unit, a vehicle identification number request signal from the emergency call unit; and
transmitting, by the head unit, the received vehicle identification number to the emergency call unit.

18. The control method of claim 12,
wherein the receiving, by the emergency call unit, of the vehicle identification number includes:
receiving, by the emergency call unit, the vehicle identification number by monitoring the vehicle identification number which is transmitted from the main controller to the head unit.

* * * * *